United States Patent
Shaikh et al.

(10) Patent No.: US 12,198,688 B2
(45) Date of Patent: Jan. 14, 2025

(54) DIGITAL ASSISTANCE DEVELOPMENT SYSTEM

(71) Applicant: The Travelers Indemnity Company, Hartford, CT (US)

(72) Inventors: Obaid Shaikh, Weatogue, CT (US); Ajay Srinivasulu, Manchester, CT (US); Madhavi Atluri, Glastonbury, CT (US); Sandhya Narayanamoorthy, South Windsor, CT (US)

(73) Assignee: THE TRAVELERS INDEMNITY COMPANY, Hartford, CT (US)

(*) Notice: Subject to any disclaimer, the term of this patent is extended or adjusted under 35 U.S.C. 154(b) by 470 days.

(21) Appl. No.: 17/355,389

(22) Filed: Jun. 23, 2021

(65) Prior Publication Data

US 2022/0415316 A1    Dec. 29, 2022

(51) Int. Cl.
*G10L 15/22*    (2006.01)
*G06F 9/54*    (2006.01)
*G06N 5/043*    (2023.01)
*G06N 20/00*    (2019.01)
*G06Q 10/10*    (2023.01)
*G06Q 10/101*    (2023.01)
*G06Q 10/109*    (2023.01)
*G10L 15/18*    (2013.01)
(Continued)

(52) U.S. Cl.
CPC .............. *G10L 15/22* (2013.01); *G06F 9/541* (2013.01); *G06N 5/043* (2013.01); *G06N 20/00* (2019.01); *G06Q 10/101* (2013.01); *G06Q 10/103* (2013.01); *G06Q 10/109* (2013.01); *G10L 15/1822* (2013.01); *G10L 15/30* (2013.01); *H04L 65/1096* (2013.01); *H04L 65/80* (2013.01); *G10L 2015/223* (2013.01)

(58) Field of Classification Search
USPC ...................................... 704/1–504
See application file for complete search history.

(56) References Cited

U.S. PATENT DOCUMENTS 8,346,563 B1 * 1/2013 Hjelm .................. G10L 15/1822
                                                         704/251
8,892,419 B2 * 11/2014 Lundberg .............. G06F 16/972
                                                         704/8

(Continued)

*Primary Examiner* — Marcus T Riley
(74) *Attorney, Agent, or Firm* — CANTOR COLBURN LLP

(57) ABSTRACT

A system includes a development system and a digital assistance system. The development system includes a network interface configured to communicate with a plurality of communication channels, a processing system configured to interface with a project management subsystem, a scheduling subsystem, and the network interface, and an application programming interface configured to receive a command sequence for the project management subsystem and the scheduling subsystem. The digital assistance system includes a natural language processing engine configured to interface with a voice-enabled communication session through one of the communication channels. The digital assistance system also includes a command generator configured to generate the command sequence based on one or more requested tasks detected through the voice-enabled communication session and provide the command sequence to the application programming interface to execute the one or more requested tasks.

26 Claims, 9 Drawing Sheets

(51) Int. Cl.
*G10L 15/30* (2013.01)
*H04L 65/1096* (2022.01)
*H04L 65/80* (2022.01)

(56) References Cited

U.S. PATENT DOCUMENTS

| | | | | |
|---|---|---|---|---|
| 8,903,711 | B2* | 12/2014 | Lundberg | G06F 8/30 |
| | | | | 704/8 |
| 10,791,078 | B2* | 9/2020 | Bergenlid | H04N 21/4788 |
| 2009/0070113 | A1* | 3/2009 | Gupta | G10L 15/22 |
| | | | | 704/257 |
| 2012/0029921 | A1* | 2/2012 | Grant | G10L 15/193 |
| | | | | 704/E21.001 |
| 2012/0117153 | A1* | 5/2012 | Gunasekar | G06Q 10/10 |
| | | | | 709/204 |
| 2013/0268260 | A1* | 10/2013 | Lundberg | G06F 11/3664 |
| | | | | 704/8 |
| 2014/0019116 | A1* | 1/2014 | Lundberg | G06F 8/30 |
| | | | | 704/8 |
| 2015/0339376 | A1* | 11/2015 | Wieweg | G06F 16/3329 |
| | | | | 717/145 |
| 2018/0089572 | A1* | 3/2018 | Aili | G06F 9/453 |
| 2018/0137856 | A1* | 5/2018 | Gilbert | G06F 3/167 |
| 2019/0036856 | A1* | 1/2019 | Bergenlid | H04N 21/4788 |
| 2022/0415316 | A1* | 12/2022 | Shaikh | G06Q 10/101 |

* cited by examiner

DIGITAL ASSISTANCE DEVELOPMENT SYSTEM

BACKGROUND

In developing complex systems, a large amount of coordination is needed between multiple entities. To facilitate coordination of development, interactive communication sessions are typically needed to track requirements development, phase completion, defects, deployment, and dependencies between activities and entities. Efforts can be coordinated through multiple communication channels, tracking tools, scheduling tools, and product development tools. Various data sources and tools may not be readily accessible to participants during a live meeting through a communication channel. Accessing data managed in a development environment can be a cumbersome and challenging task, as data distributed across multiple systems and subsystems may not be directly linked and can have different access controls.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a system for a digital assistance development system is provided. The system can provide voice-enabled interaction through a digital assistance system that can dial into a meeting through a communication channel to interact with other participants connected to the communication channel through one or more user systems. The digital assistance system can access various data sources and subsystems of a development environment used by the participants to report status, initiate updates, schedule future meetings, generate tasks, and trigger events, for example. The digital assistance system can operate through a voice-based interface and/or a typed-text interface to receive commands and provide responses. The digital assistance system can be sent a meeting invitation with authentication information to support connecting to a communication channel, such as a voice and/or data exchanging communication system that supports teleconferences and/or video conferences. The digital assistance system can collect a sequence of commands during a meeting, convert the commands into a format compatible with an application programming interface (API) of a development system, and send the command sequence to the API to trigger actions within the development system. In some instances, a response is returned to the digital assistance system, which is further processed for reporting, scheduling, and/or other actions. Actions triggered by the sequence of commands may also result in one or more subsystems of the development environment sending a response directly to one or more user systems, bypassing the digital assistance system, for a faster response time.

The API of the development system can limit the permissions of actions initiated by the digital assistance system and limit access to selected data sources depending on the sensitivity of the data. Further, the digital assistance system and API can enhance security by having the digital assistance system identify a user initiating a command and the API verifying whether the identified user has permission to execute the requested command. For example, a user identified as having supervisor-level access can be allowed to execute commands in the development environment that other users may not have permission to perform. Further, users with permissions for one project may not be able to access data or initiate actions for projects where the users do not have such permissions. Thus, the digital assistance system can automate tasks and gather data from the development environment in a voice or chat-based series of interactions to enhance user interface experience, while also maintaining the underlying security rules of the development environment. The system, as further described herein, can enable more effective management of computing resources and data sources in a development environment and thus provides technical benefits.

Figure 1:
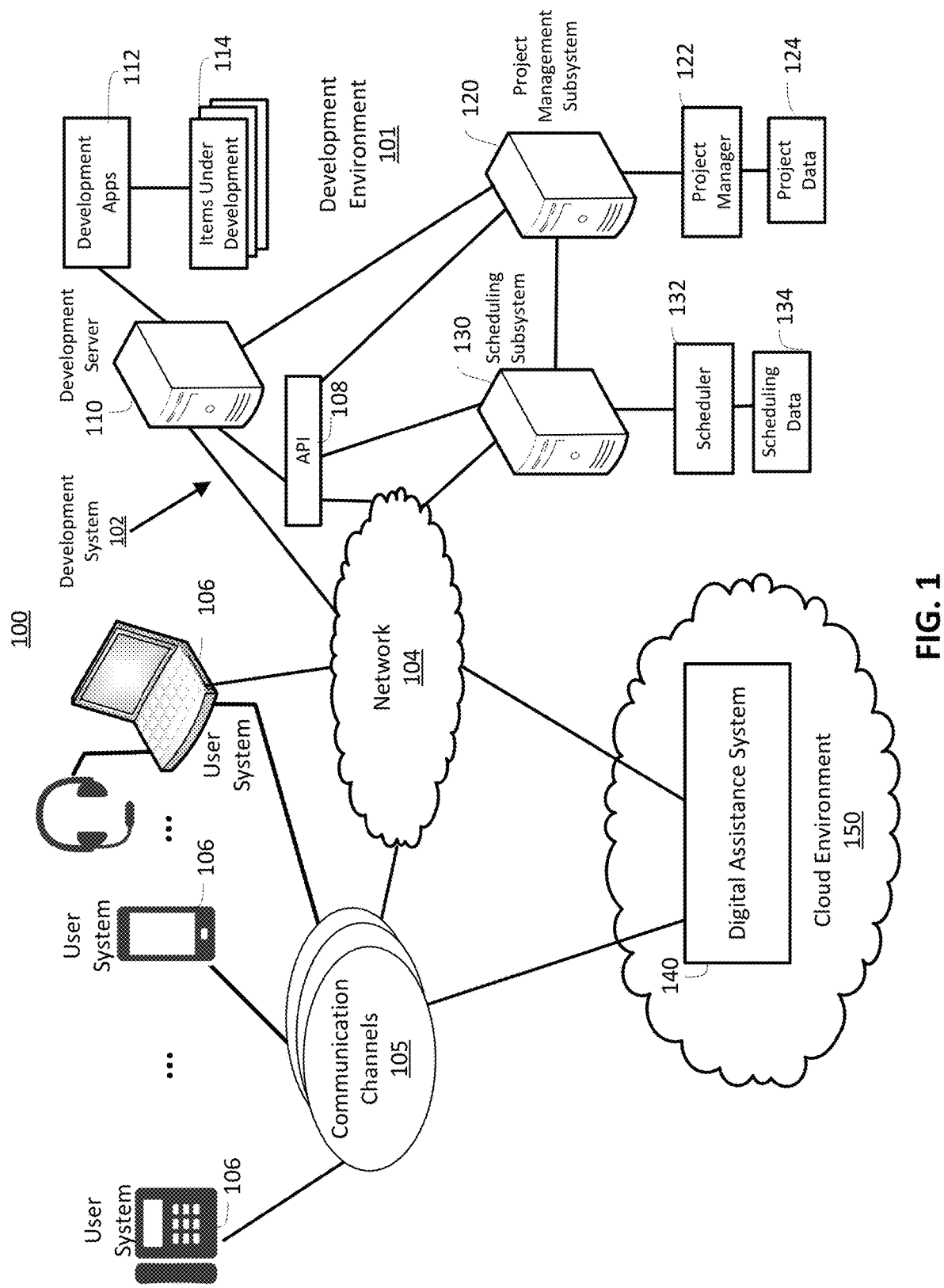
FIG. 1 depicts a block diagram of a system according to some embodiments of the present invention.

Turning now to FIG. 1, a system 100 is depicted upon which digital assistance-enabled development may be implemented. The system 100 includes a development environment 101 with a development system 102 coupled to a network 104. The development environment 101 can also include a development server 110, a project management subsystem 120, a scheduling subsystem 130, and other subsystems or servers (not depicted). The development system 102 can include an API 108 and computing and networking resources, such as those further described in reference to FIG. 2. In some embodiments, the computing and networking resources of the development system 102 can be hosted by the development server 110 and/or distributed between the project management subsystem 120 and/or the scheduling subsystem 130. The development server 110 can execute one or more development applications 112 that are used to view and edit a plurality of items under development 114. The items under development 114 can be software in a source code format, an object format, and/or an executable format. As projects are developed and deployed that involve the creation of multiple software components, selected portions of the items under development 114 can be linked to form a software product that may be executable in a targeted environment, such as a mobile device, a server, a web server, a personal computer, an embedded computing device, or other such computing devices.

There can be multiple developers involved in creating and deploying products that incorporate the items under development 114. The project management subsystem 120 can include a project manager application 122 that tracks the status and steps involved in creating, testing, and deploying the items under development 114 as one or more projects in project data 124. Users can be assigned tasks with deadlines to meet a development and deployment schedule. As project development advances, meetings can be scheduled to report status, identify defects, and handle various issues. The scheduling subsystem 130 can include a scheduler application 132 to coordinate the scheduling of meetings through one or more communication channels 105. Scheduling data 134 can be tracked for multiple users to select days and times where the users can participate in an interactive meeting regarding project development. The users can interface with the communication channels 105 through various types of user systems 106. For example, the user systems 106 can include telephones, mobile devices, and/or voice-enabled computing devices. The communication channels 105 can be voice-enabled and/or video-enabled communication systems coupled to the network 104 and configured to exchange audio, video, and/or data streams during interactive communication sessions between at least two participants. One or more of the user systems 106 may also be coupled to the network 104 to support development, management, and scheduling activities through the development environment 101.

In embodiments, a digital assistant system 140 can interface with a voice-enabled communication session through one of the communication channels 105. The digital assistant system 140 can also interface with the development environment 101 through the API 108 by communicating through the network 104. The digital assistance system 140 can be implemented, for example, in a cloud environment 150 as a service to assist in project management and scheduling tasks. Further, the digital assistance system 140 may access other components accessible to the development system 102, such as interfacing with development applications 112 and/or other systems (not depicted). As one example, when a meeting is scheduled through the scheduling subsystem 130 to review and take actions on the project data 124, the digital assistance system 140 can be invited as a meeting participant, where the scheduler application 132 may provide connection information and credentials to connect to one of the communication channels 105 with one or more other participants. The human participants can connect to a voice-enabled communication session through the user systems 106, while the digital assistance system 140 acts as a voice-enabled assistant to gather data, perform actions, and other such tasks with respect to components of the development environment 101. During the voice-enabled communication session, the digital assistance system 140 can provide immediate feedback to some requests of the participants, while other requests may be collected in a command sequence to send to the API 108 based on detecting termination of the voice-enabled communication session. For example, the digital assistance system 140 can collect commands provided in a natural language format and convert the commands into a format compatible with the API 108, such as a JavaScript Object Notation (JSON) format or other such machine-interpretable format. Other example formats can include extensible markup language (XML), text-based scripts, encoded objects, serialized data, and/or other such formats. Responses from the commands sent to the API 108 can be relayed back to the digital assistance system 140 or may be sent directly to one or more of the user systems 106.

In the example of FIG. 1, each of the development system 102, user systems 106, development server 110, project management subsystem 120, scheduling subsystem 130, and cloud environment 150 can include at least one processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the development system 102, user systems 106, development server 110, project management subsystem 120, scheduling subsystem 130, and/or cloud environment 150. The cloud environment 150 can include computing resources distributed over multiple networked computer systems.

The user systems 106 may be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 can be operated by users of development environment 101, managers, and/or administrators.

Each of the development system 102, user systems 106, development server 110, project management subsystem 120, scheduling subsystem 130, and cloud environment 150 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The network 104 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 104 may be implemented using a wired network, an optical network, a wireless network, and/or any kind of physical network implementation known in the art.

Figure 2:
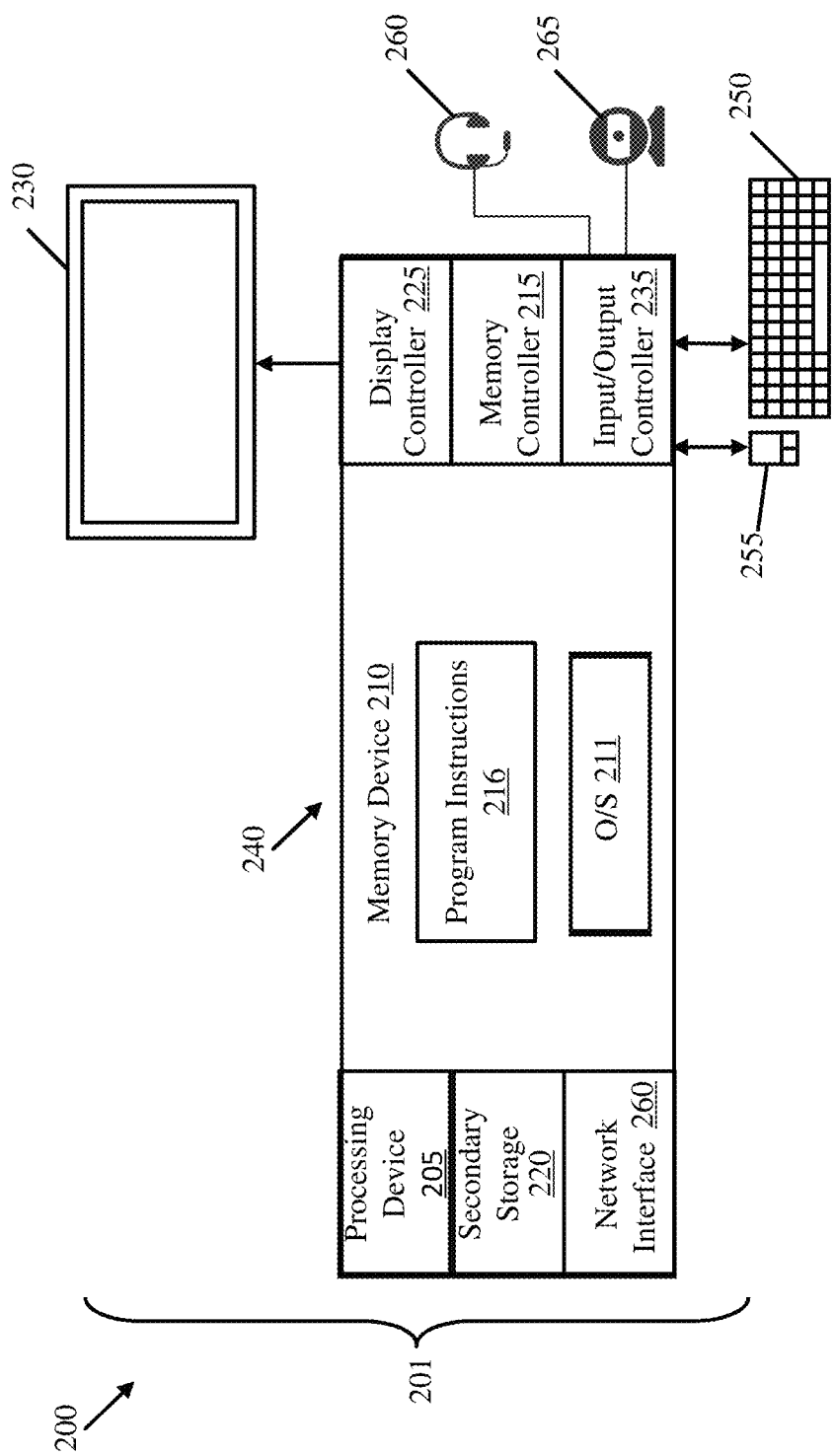
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the development system 102, user systems 106, development server 110, project management subsystem 120, and/or scheduling subsystem 130 of FIG. 1. Multiple instances of the system 200 can be interconnected and managed by a third-party to form the cloud environment 150.

In an exemplary embodiment, in terms of hardware architecture, as shown in FIG. 2, the computer 201 includes a processing device 205 and a memory device 210 coupled to a memory controller 215 and an input/output controller 235. The processing device 205 can also be referred to as a processing system 205 and may include multiple processors (e.g., one or more multi-core processors). The input/output controller 235 can also interface with audio devices 260, such as speakers, a microphone, a headset, etc. The input/output controller 235 can also receive video or image input through a camera 265, for example, to support video teleconferencing. The memory device 210 can also be referred to as a memory system 210 and may include multiple types of memory in various configurations, such as a combination memory cards and memory chips with volatile and/or non-volatile storage capacity. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom-made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the API 108, development applications 112, the project manager application 122, the scheduler application 132 and/or the digital assistance system 140 of FIG. 1.

The computer 201 of FIG. 2 also includes a network interface 260 that can establish communication channels with one or more other computer systems via one or more network links of the network 104 of FIG. 1. The network interface 260 can support wired and/or wireless communication protocols known in the art. For example, when embodied in the development system 102 of FIG. 1, the network interface 260 can establish communication channels with at least one of the cloud environment 150 of FIG. 1 and the communication channels 105 of FIG. 1 via the network 104 of FIG. 1.

Figure 3:
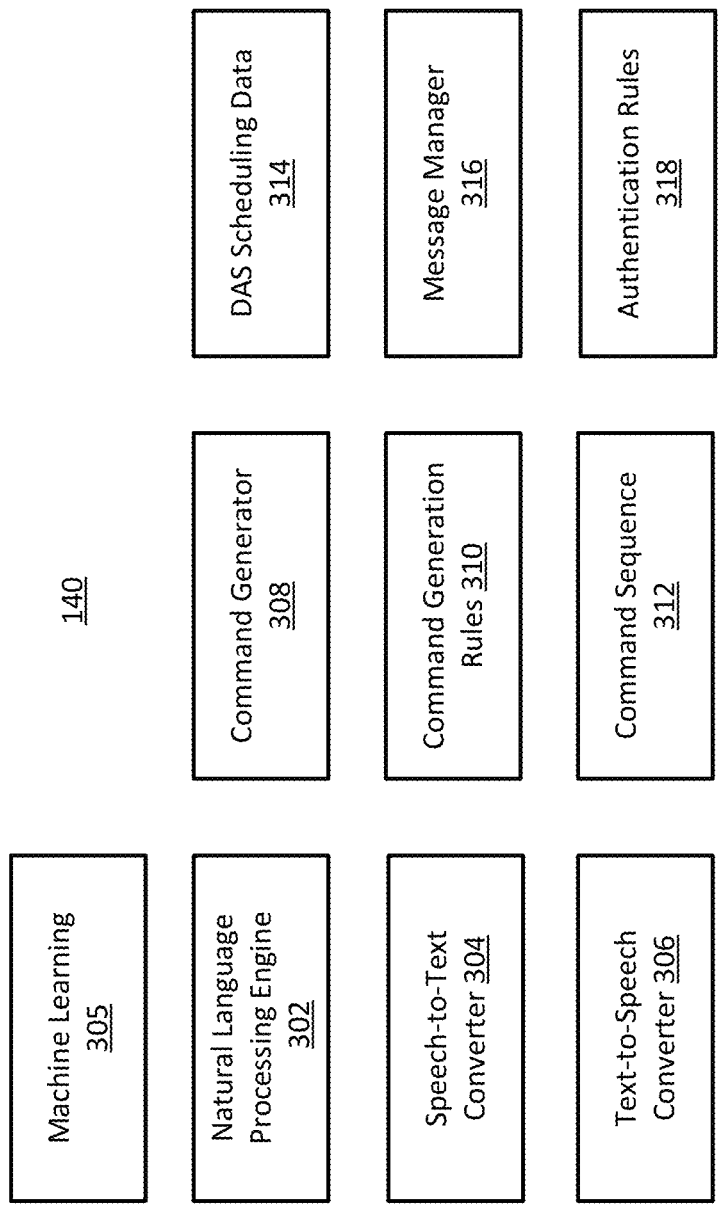
FIG. 3 depicts a block diagram of a digital assistance system according to some embodiments of the present invention.

FIG. 3 depicts an example of a block diagram of components of the digital assistance system 140 according to an embodiment and is described in reference to FIGS. 1-3. As depicted in the example of FIG. 3, the digital assistance system 140 can include a natural language processing engine 302 configured to interface with a voice-enabled communication session through one of the communication channels 105 of FIG. 1. The digital assistance system 140 can include a speech-to-text converter 304 and a text-to-speech converter 306. When input is received as speech/voice data, the speech-to-text converter 304 can apply machine-learning or other techniques to convert speech data into text data. Similarly, where speech/voice-based output is desired, the text-to-speech converter 306 can convert text data into speech data, for example, as an audio output to a voice-enabled communication session. Similar to the speech-to-text converter 304, the text-to-speech converter 306 can apply machine-learning or other techniques to convert text data into speech data. The natural language processing engine 302 can apply machine learning or other techniques to interpret language input, which may be preprocessed by the speech-to-text converter 304. The natural language processing engine 302 can also interface with machine learning 305 to group commands and determine various alternative expressions that relate to a single action. For example, machine learning 305 can learn relationships between phrases that are used interchangeably to map expression variations to standardized text and expressions for parameters and commands.

Human users may use many different word choices to express information. For example, a user may state, "schedule a meeting for tomorrow at noon", "schedule a meeting for 12 o'clock tomorrow", "schedule a meeting at 12 PM tomorrow", "schedule a noon meeting tomorrow", "schedule a meeting for the team at the same time tomorrow", "schedule a conference call at 12 tomorrow", etc. The natural language processing engine 302 can be trained to interpret many different combinations into a consistent format. For instance, each of the previous examples may map to a natural language result of "schedule a meeting for this group of participants on May 4, 2021 at 12:00 local time". A command generator 308 of the digital assistance system 140 can parse the natural language result and apply command generation rules 310 to generate a command string that is interpretable by one or more components of the development environment 101 of FIG. 1. For example, the resulting command may be "scheduling_subsystem→add_meeting(user1, user2, user3, user4, DAS; May_4_2021; 4:00 GMT)". In this example, the command string is formatted for interpretation by the API 108 of FIG. 1 to pass the command to the scheduling subsystem 130 of FIG. 1, requesting that the scheduler application 132 generate a new meeting event for the current group of user1, user2, user3, user4, and the digital assistance system (DAS) 140 for May 4, 2021 using Greenwich Mean Time as the time base (e.g., where 4:00 GMT maps to 12:00 local time). If the command is determined as incomplete or uninterpretable by the command generator 308, a response prompting for further clarification from the users can be passed back through the natural language processing engine 302 and text-to-speech converter 306, as needed, to seek more information or clarification from the users during the voice-enabled communication session. As multiple commands are collected, the commands may be sent directly to the API 108 for real-time actions or collected in a command sequence 312 to be sent to the API 108 at a future time.

Some scheduling requests and data may be locally tracked by the digital assistance system 140 in digital assistance system scheduling data 314. For example, the scheduling subsystem 130 of FIG. 1 may send a meeting request to the digital assistance system 140. A message manager 316 of the digital assistance system 140 can interpret the meeting request and pass the meeting request to the digital assistance system scheduling data 314 to schedule a join-meeting event based on the meeting request. Some meeting requests may include authentication information needed to join the meeting to verify user information and permissions associated with participating in a meeting through the communication channels 105. Authentication formats and procedures may vary between the communication channels 105. Authentication rules 318 can store information and protocol formats needed for the digital assistance system 140 to successfully connect with a particular communication channel 105. For example, some login information or multi-step authentication may be needed by the digital assistance system 140 and such information may not be directly included in the meeting request but can be managed by the authentication rules 318 of the digital assistance system 140.

Figure 4:
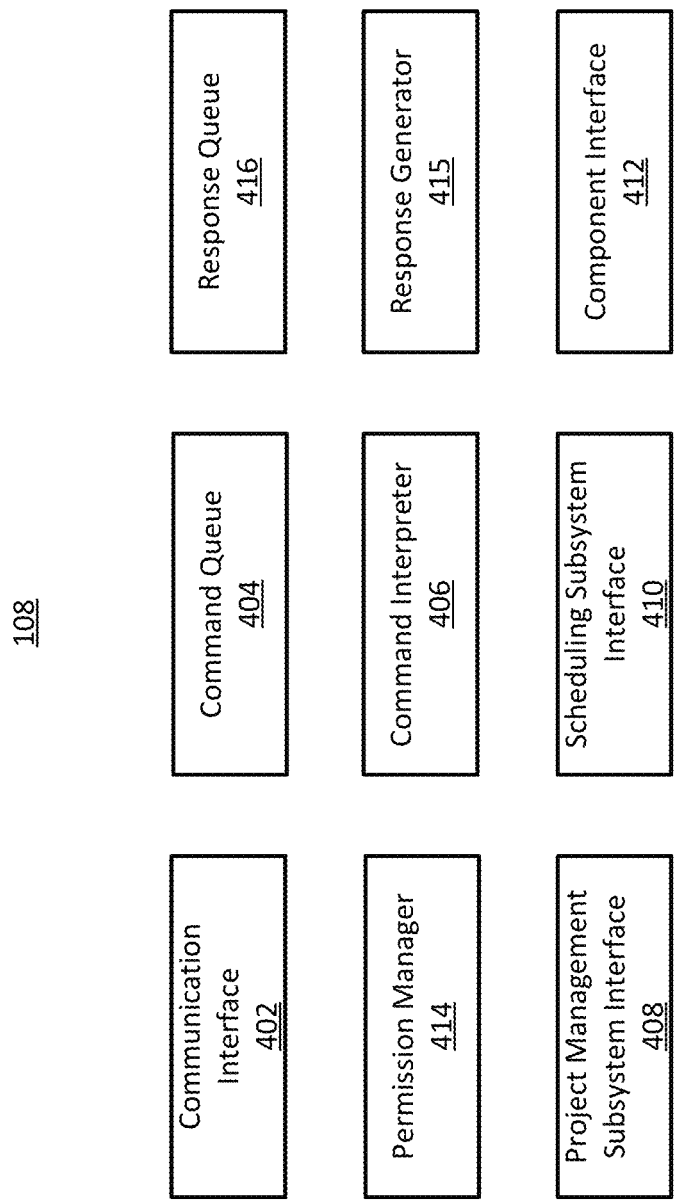
FIG. 4 depicts a block diagram of an application programming interface for a development system according to some embodiments of the present invention.

FIG. 4 depicts an example of a block diagram of components of the API 108 according to an embodiment and is described in reference to FIGS. 1-4. The API 108 can include a communication interface 402 configured to receive and send communication with various entities, such as the digital assistance system 140. Where multiple commands, such as command sequence 312, are received through the communication interface 402, the commands can be buffered in a command queue 404 for further processing by a command interpreter 406. The command interpreter 406 can determine whether commands in the command queue 404 are supported by the development environment 101. For example, the command interpreter 406 may determine that a command is targeting the project management subsystem 120, and the command is passed to a project management subsystem interface 408 for further processing by the project management subsystem 120. Similarly, the command interpreter 406 may determine that a command is targeting the scheduling subsystem 130, and the command can be passed to a scheduling subsystem interface 410 for further processing by the scheduling subsystem 130. Further, the command interpreter 406 may determine that a command is targeting another component of the development environment 101, such as the development server 110, and the command can be passed to a component interface 412 associated with the targeted component.

In some embodiments, permission to interface with underlying subsystems and components of the development environment 101 may be managed by a permission manager 414 that is part of the API 108 or accessible by the API 108. For instance, a command may also include a user identifier indicating which user requested that the command be performed. As one example, each user connecting to a voice-enabled communication session may be required to login such that a user identifier of each participant is known. Voice streams or data streams generated by each user can be tagged and tracked through the communication channels 105 and/or by the digital assistance system 140. The digital assistance system 140 can include the user identification tags indicating which user requested that a command be performed. User identification tags may be used with a subset of commands which may access or modify limited-access data. The user identification tags can be verified by the permission manager 414 and passed through to the targeted component such that localized access controls and logs can be maintained. Therefore, for components that track the initiation of tasks on a user basis, the tracking information can be maintained as if the user had directly issued the command without assistance from the digital assistance system 140. The permission manager 414 can manage permissions for users or groups to authenticate users. For example, users can be authenticated through multiple factors, such as a pass code, sending a code to one or more devices of a user, and/or other authentication techniques known in the art, The API 108 can also include a response generator 415 that generates responses to the commands received through the communication interface 402. Responses provided by underlying components, such as those received through the project management subsystem interface 408, scheduling subsystem interface 410, and component interface 412, can be adjusted or reformatted as needed by the response generator 415 to align with interfacing requirements of the digital assistance system 140. Some commands may result in no response, while other commands may result in a direct response from the targeted component to one or more other systems/devices. For example, a meeting scheduling request in a command received at the communication interface 402 from the digital assistance system 140 may be interpreted by the command interpreter 406 and passed to the scheduling subsystem interface 410, which passes the meeting scheduling request to the scheduling subsystem 130. The scheduler application 132 of FIG. 1 can check the scheduling data 134 of FIG. 1, verify the request, update the scheduling data 134, and send a meeting request as a message to targeted instances of the user systems 106 and the digital assistance system 140 without necessarily sending a response back to the API 108. Where multiple responses are generated in response to one or more commands, output of the response generator 415 can be buffered in the response queue 416 prior to transmission through the communication interface 402.

An example of targeted components that can be accessible by the component interface 412 can include human resource components. As an example, a human resource component accessible through the component interface 412 can have an interface configured to exchange data, commands, and responses with the API 108. For instance, if a user passes a status update or command to the API 108 indicating that a day off or sick day has been requested for a particular date, the API 108 can use the scheduling subsystem interface 410 to trigger meeting cancelation notices and optionally, rescheduling requests for any meetings scheduled on the date. Further, through the component interface 412, the change in work status can be logged to update a time bank to track the time off on behalf of the user. Thus, in this example, a voice-based interaction with the digital assistance system 140 of FIG. 1 can result in automated updates through one or more subsystems to notify others and perform internal time management operations without the user specifically having to request each action. Further, when implemented in an interactive format, the digital assistance system 140 can receive feedback based on the updates and relay the feedback to the user through user system 106. As an example, the user may be informed of the status of meetings rescheduled based on the time off request and/or the status of time banks available for the time off.

As another example, the component interface 412 can be configured to target applications within the development environment 101 or external to the development environment 101. For instance, a carpooling application may exist local to the development environment 101 or be external to the development environment 101, where a time off request may trigger the carpooling application to notify other users that a carpooling user will not be present on a particular day/time. The results of change requests can be reported to the user back through the digital assistance system 140 or through other interfaces. The component interface 412 can have user-based permissions and configuration data available to determine which applications or subsystems a user can modify through the digital assistance system 140. Permissions can be managed through the permission manager 414 or another component/system.

Figure 5:
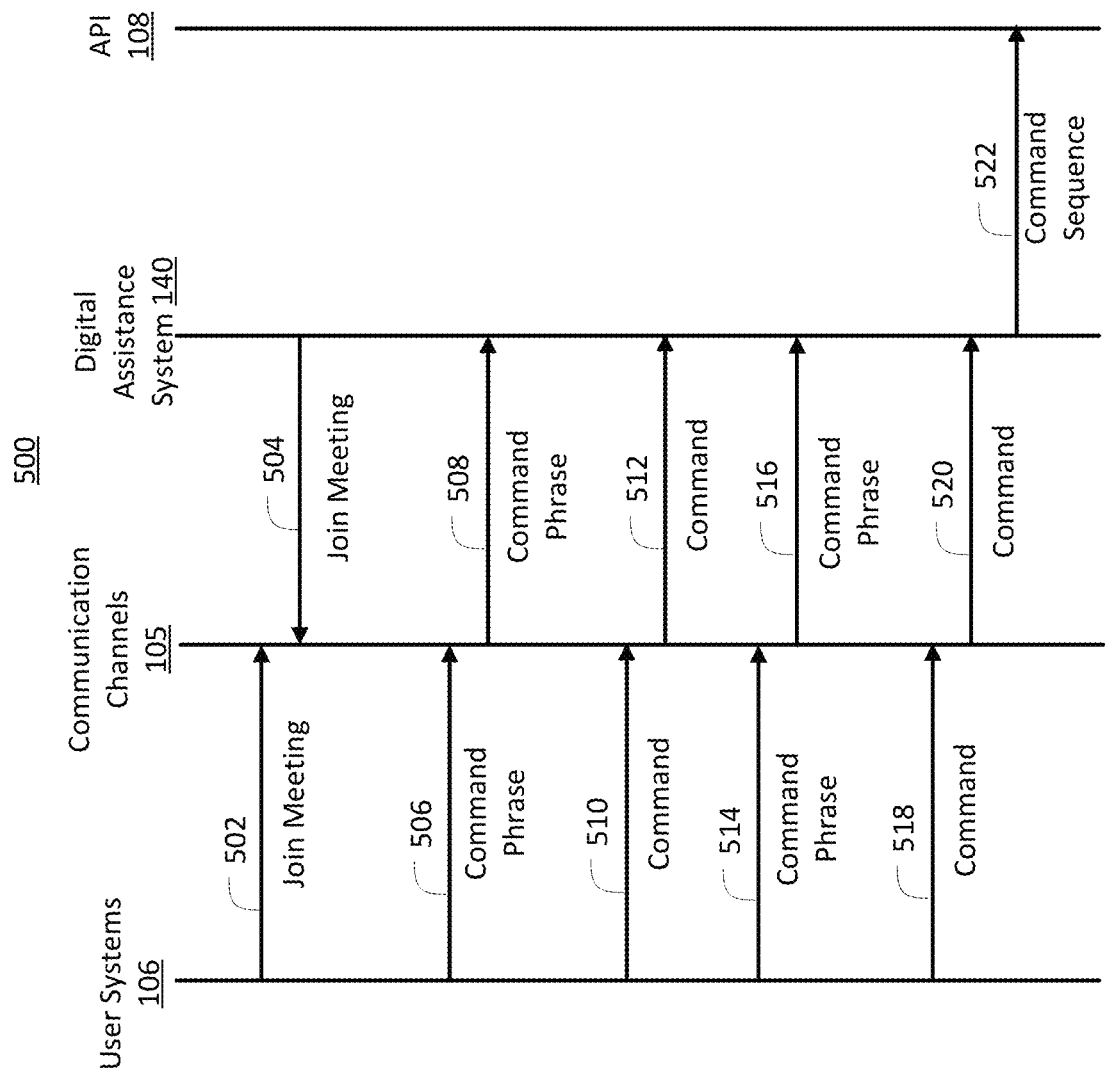
FIG. 5 depicts a block diagram of an interaction sequence using a queued command sequence according to some embodiments of the present invention.

FIG. 5 depicts a block diagram of an interaction sequence 500 using a queued command sequence according to some embodiments. As an example, the interaction sequence 500 begins with one or more user systems 106 joining a meeting at event 502 as a voice-enabled communication session hosted by one or more communication channels 105. As part of event 502, authentication can be performed to confirm that each user is authorized to connect and perform actions. The digital assistance system 140 also joins the meeting at event 504, thereby connecting to the voice-enabled communication session hosted by one or more communication channels 105. The digital assistance system 140 monitors the voice-enabled communication session for a command phrase. At event 506, a user of the user systems 106 issues a command phrase, which is detected at event 508 by the digital assistance system 140. The command phrase can be a voice-based phrase, such as, "Hey DAS", that triggers the digital assistance system 140 to listen for a command that is about to follow. At event 510, the user of the user systems 106 states a command that is detected at event 512 by the digital assistance system 140.

In the example of FIG. 5, rather than immediately forwarding the command received at event 512, the digital assistance system 140 queues the command to send to the API 108 at a future time. The digital assistance system 140 continues to monitor the voice-enabled communication session for another command phrase. At event 514, a user of the user systems 106 issues a command phrase, which is detected at event 516 by the digital assistance system 140. The user issuing the command phrase may be the same user who issued the command phrase at event 506 or another user participating in the voice-enabled communication session. At event 518, the user of the user systems 106 states a command that is detected at event 520 by the digital assistance system 140.

In the example of FIG. 5, after accumulating multiple commands, the digital assistance system 140 can provide the commands as a command sequence at event 522 to the API 108. Before or as part of event 522, authentication of the user or system initiating the command sequence can be verified to ensure that proper permissions exist before proceeding with updates through the API 108. Triggering transmission of the command sequence can be based on an event, such as detecting termination of the voice-enabled communication session, filling of a command queue, elapsing of a period of time, or other such factor. In some embodiments, the API 108 can provide a response to the digital assistance system 140 that may or may not be shared with the user systems 106.

Figure 6:
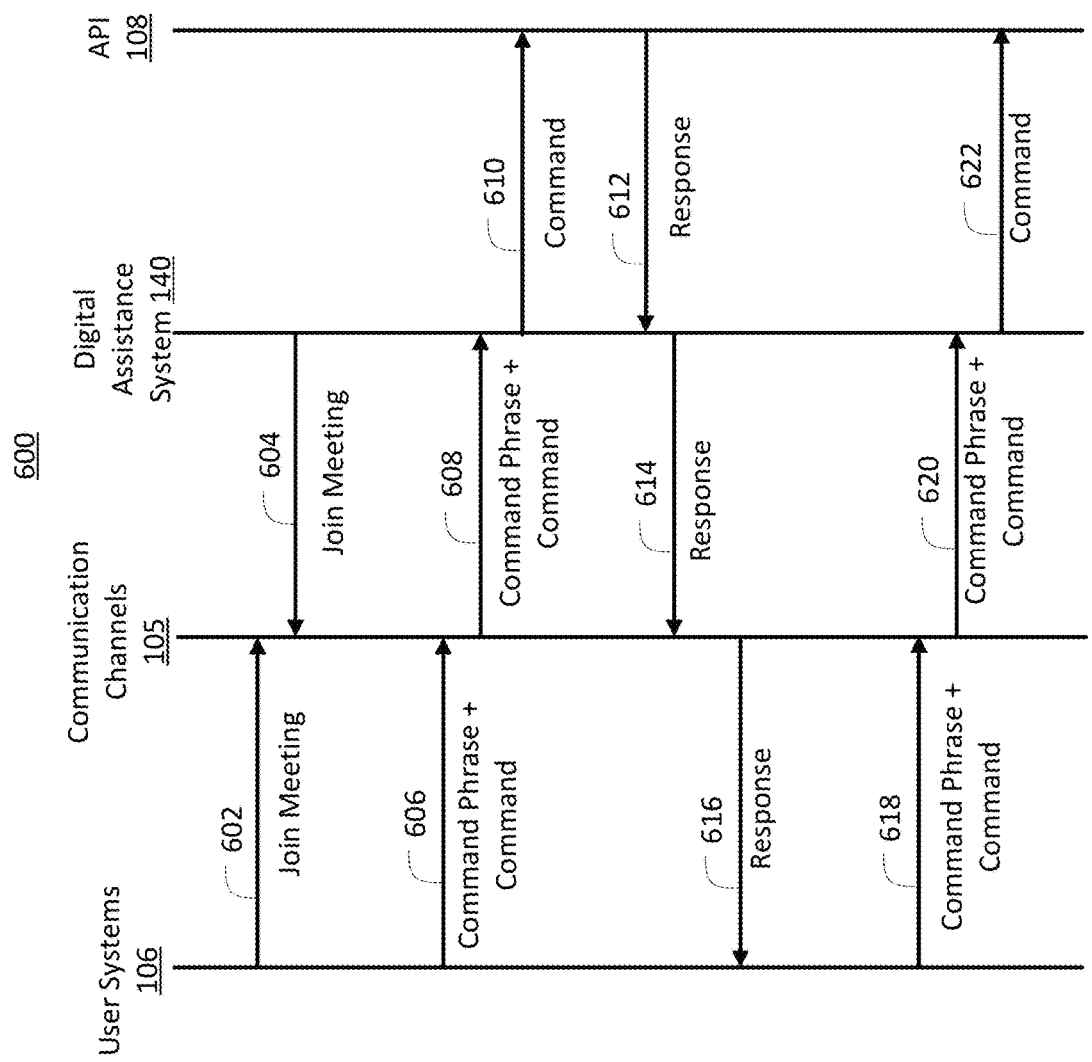
FIG. 6 depicts a block diagram of a real-time interaction sequence according to some embodiments of the present invention.

FIG. 6 depicts a block diagram of a real-time interaction sequence 600 according to some embodiments. In the example of FIG. 6, one or more user systems 106 join a meeting at event 602 as a voice-enabled communication session hosted by one or more communication channels 105. The digital assistance system 140 also joins the meeting at event 604, thereby connecting to the voice-enabled communication session hosted by one or more communication channels 105. As part of events 602 and 604, authentication can be performed to confirm that each user and system is authorized to connect and perform actions. The digital assistance system 140 monitors the voice-enabled communication session for a command phrase. At event 606, a user of the user systems 106 issues a command phrase and a command, which is detected at event 608 by the digital assistance system 140. The digital assistance system 140 can apply natural language processing by the natural language processing engine 302 to identify one or more requested tasks associated with issuing the command phrase. The command can be converted to a format that is compatible with the API 108 and provided to the API 108 at event 610.

Upon processing the command or command sequence received at the API 108, at event 612, the API 108 can send a response. For example, where the command is a status request, the response can be project status information extracted from the project data 124. At event 614, the digital assistance system 140 can reformat the response from the API 108 into a natural language format and send the response to the communication channels 105. The response is transmitted from the communication channels to one or more user systems 106 at event 616. For example, the response may be in the form of a document or text sent through a directed chat to a targeted user or may be broadcast to all users connected to the voice-enabled communication session. For instance, the digital assistance system 140 may use the text-to-speech converter 306 to convert a text-based response from the API 108 into speech audibly broadcast to all users listening to the voice-enabled communication session.

The same user or another user of the user systems 106 can issue another command phrase and command to the communication channels 105 at event 618. At event 620, the digital assistance system 140 can parse the command phrase and command. The command can be converted into a format that is compatible with the API 108 and sent to the API 108 at event 622. Before or as part of events 610 and 622, authentication of the user or system initiating a command sequence can be verified to ensure that proper permissions exist before proceeding with updates through the API 108. The sequence can continue with real-time data exchange as part of the real-time interaction sequence 600 until the meeting ends.

Figure 7:
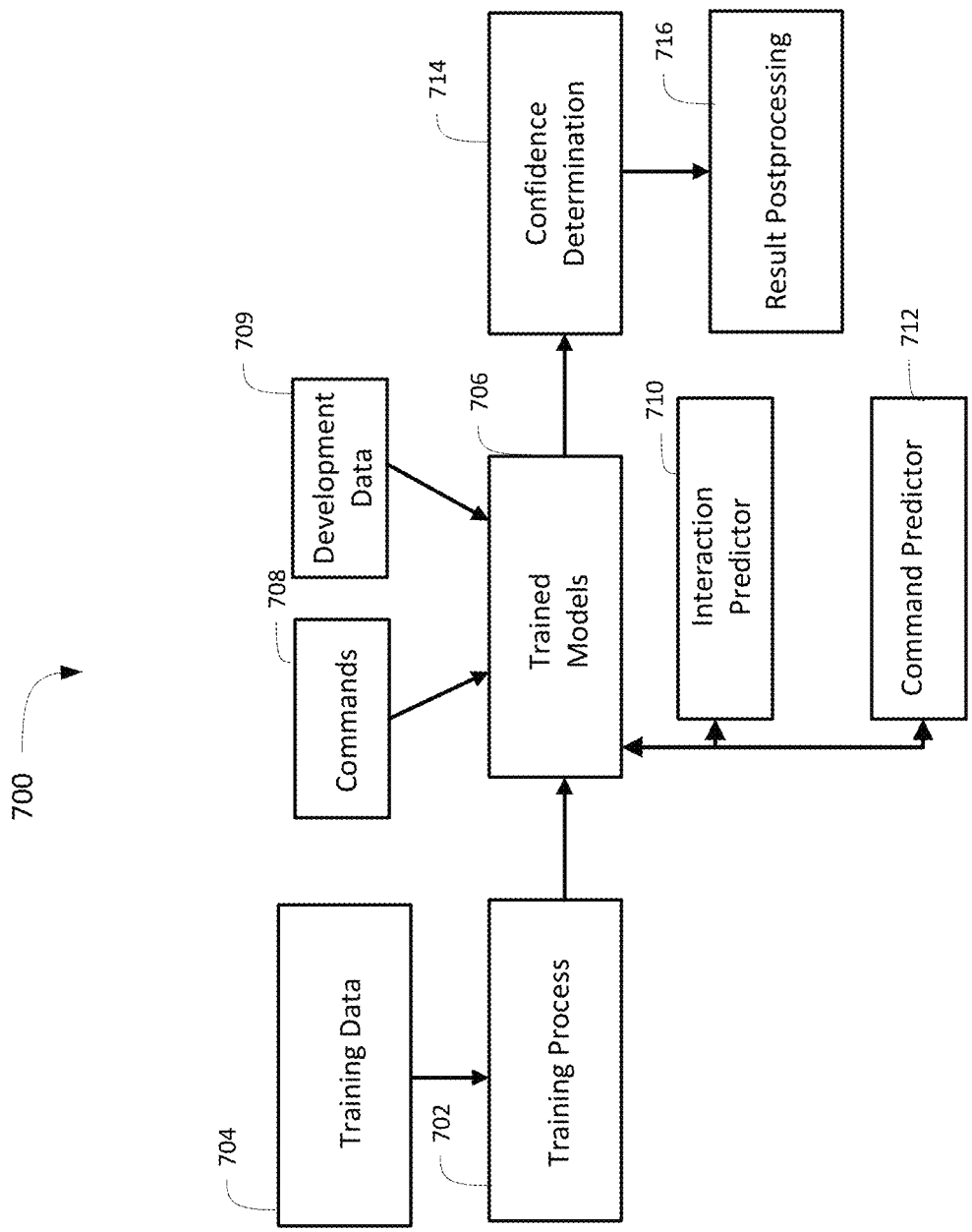
FIG. 7 depicts a training and prediction process according to some embodiments of the present invention.

FIG. 7 depicts a training and prediction process 700 according to some embodiments. The training and prediction process 700 can include a training process 702 that analyzes training data 704 to develop trained models 706 as examples of an interaction predictor 710 and command predictor 712. The training process 702 can use labeled or unlabeled data in the training data 704 to learn features, such as a mapping of words and phrases to commands and parameters. The training data 704 can include logs of previously executed commands, parameters, and event sequences captured for the development environment 101 of FIG. 1 or a similar system and other data to establish a ground truth for learning coefficients/weights and other such features known in the art of machine learning to develop trained models 706. The trained models 706 can include a family of models to identify specific types of features from commands 708 and/or development data 709. The commands 708 can be collected during interaction sequences with the digital assistance system 140 of FIG. 1 and/or extracted from log files associated with operation of the development environment 101 of FIG. 1. The development data 709 can comprise data extracted from the project data 124 and/or scheduling data 134 of FIG. 1 to learn format patterns of systems, such as the project management subsystem 120 and the scheduling subsystem 130 of FIG. 1. The trained models 706 can include the interaction predictor 710 to support the natural language processing engine 302 of FIG. 3 through machine learning 305 of FIG. 3 in determining how to interpret a combination of inputs and how to phrase follow-up questions to collect missing/incomplete user input. The command predictor 712 can be used by the command generator 308 and/or the command generation rules 310 of FIG. 3 to interpret inputs as specific commands that can be processed by the API 108 of FIG. 1. Other such models and further subdivision of the trained models 706 can be incorporated in various embodiments.

The trained models 706 can output a confidence determination 714 indicating a confidence level of an interaction prediction or command prediction. For example, where there is a conversion error by the speech-to-text converter 304 of FIG. 3, such as decoding a command as "schedule a meeting at MOON", the confidence determination may be below a threshold as not matching a known pattern. Depending on the confidence level with alternate interpretations, such as "schedule a meeting at NOON", the command predictor 712 can predict a corrected command and avoid an error condition. Where the confidence level is below a threshold level such that an alternate formulation that has a higher confidence level above a threshold is not known, the interaction predictor 710 can determine, for example, one or more proposed follow-up questions to ask the user, such as, "Can you please repeat your last command request?" or "Can you please repeat the time for your meeting request?" Result postprocessing 716 can determine an action to take based on the confidence level identified by the confidence determination 714, such as using a corrected command or initiating an interaction for further clarification. As results are processed and interpreted, the results or user responses to the results can be used as feedback to adjust the confidence determination 714.

Figure 8:
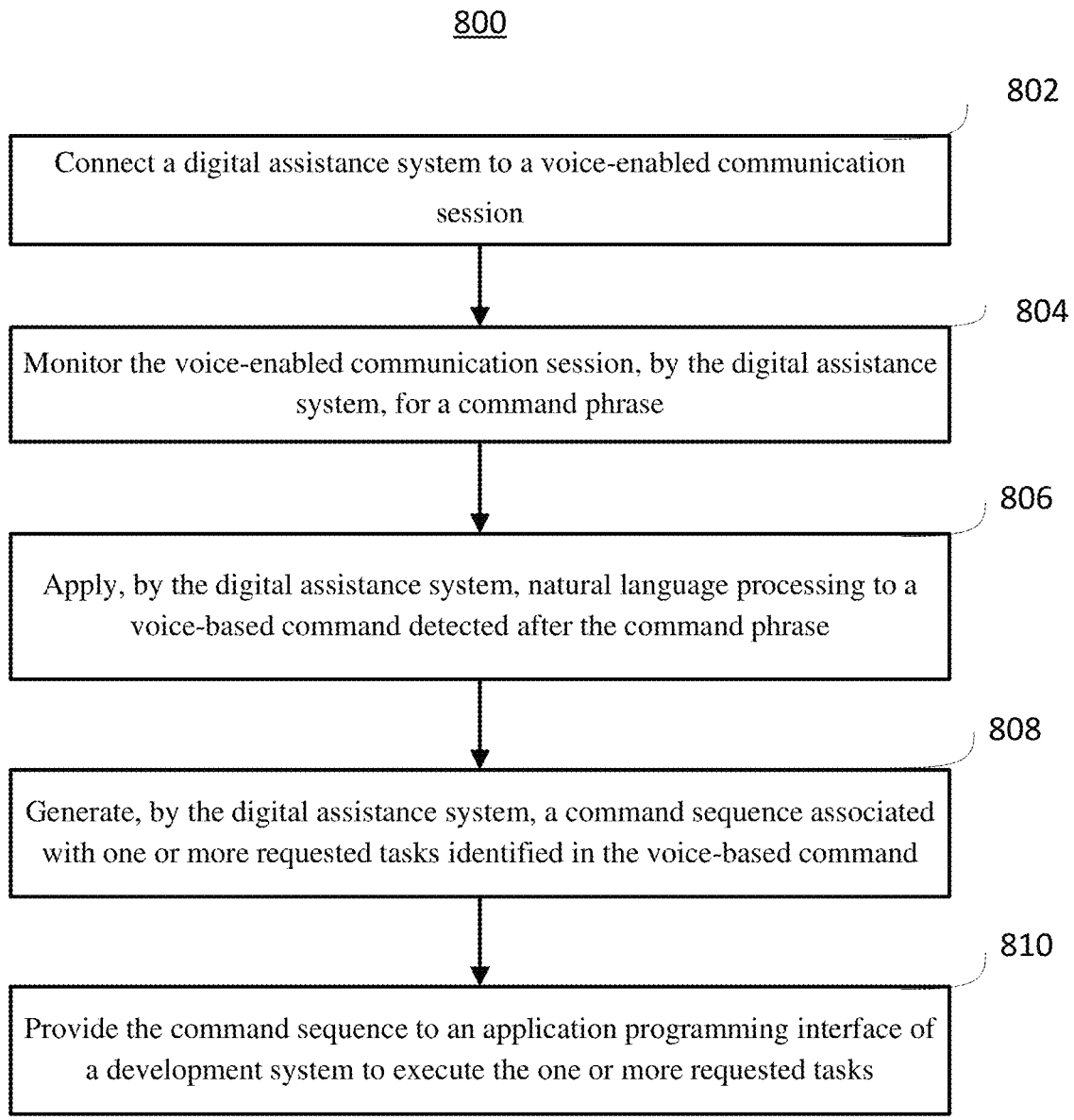
FIG. 8 depicts a process flow according to some embodiments of the present invention.

Turning now to FIG. 8, a process flow 800 is depicted according to an embodiment. The process flow 800 includes a number of steps that may be performed in the depicted sequence or in an alternate sequence. The process flow 800 may be performed by the system 100 of FIG. 1. In one embodiment, the process flow 800 is performed by the digital assistance system 140 of FIG. 1 in combination with the development environment 101 of FIG. 1. Although the example of process flow 800 is described in reference to the digital assistance system 140, the process flow 800 can apply to other combinations of components, including components not depicted in FIG. 1. The process flow 800 is described in reference to FIGS. 1-8.

At step 802, the digital assistance system 140 connects to a voice-enabled communication session. The connection can occur through a communication channel 105 that connects one or more user systems 106 to the voice-enabled communication session. The connection can be made as scheduled through digital assistance system scheduling data 314 in response to a meeting request from the scheduler application 132 or other input. Validation and authentication of users connecting to the communication channel 105 and/or the digital assistance system 140 can be performed as an initial security screening. Validating and authenticating users early in the process can enhance security before any interactions are attempted with the API 108.

At step 804, the digital assistance system 140 monitors the voice-enabled communication session for a command phrase. The command phrase provides a prompt that one or more commands will follow.

At step 806, the digital assistance system 140 can apply natural language processing to a voice-based command detected after the command phrase. The natural language processing can include converting the voice-based command into text by the speech-to-text converter 304 and interpreting language patterns by the natural language processing engine 302.

At step 808, the digital assistance system 140 can generate a command sequence associated with one or more requested tasks identified in the voice-based command. For example, the command generator 308 can apply the command generation rules 310 to the text equivalent of the voice-based command to identify one or more requested tasks to be performed with respect to the development environment 101. The command predictor 712 can be used to predict whether the text equivalent of the voice-based command likely matches an expected pattern such that the requested tasks have likely been correctly identified. The interaction predictor 710 can be used to predict whether one or more follow-up questions should be asked of the users before passing the commands in the command sequence 312 to the API 108. For example, tasks may be interpreted as performing a status update based on the project data 124, performing an estimate update, creating new content, creating a new tracking metric, creating a meeting invitation based on scheduling data 134, extracting a portion of code from the items under development 114 for review or testing, and other such tasks.

At step 810, the command sequence 312 can be provided to the API 108 of the development system 102 to execute the one or more requested tasks. For example, the API 108 can interpret the commands received from the digital assistance system 140 and send them to one or more components of the development environment 101 to be performed.

In some embodiments, the digital assistance system 140 can identify the voice-enabled communication session based on receiving a meeting request from the scheduling subsystem 130 of the development system 102. The digital assistance system 140 can also perform an authentication with a communication channel 105 based on the authentication rules 318 to connect the digital assistance system 140 to the voice-enabled communication session. Voice-based commands can be captured from one or more user systems 106 connected to the voice-enabled communication session. The voice-based commands can be converted into a command format for the API 108 of the development system 102. One or more formatted commands can be inserted into the command sequence 312 for the API 108. The digital assistance system 140 can also identify a user providing a detected voice input of the voice-based command and tag the voice-based command with a user identifier based on identifying the user.

In some embodiments, the digital assistance system 140 can collect input for the command sequence 312 while the voice-enabled communication session is active. The digital assistance system 140 can provide the command sequence 312 to the API 108 based on detecting termination of the voice-enabled communication session or may provide the command sequence 312 to the API 108 shortly after populating the command sequence 312.

In some embodiments, the digital assistance system 140 can monitor for a response to the command sequence 312 from the API 108. One or more targeted users associated with the response can be identified. At least a portion of the response may be communicated to the one or more targeted users. A portion of the response to the one or more targeted users can be converted into a speech-formatted response, for instance, using the text-to-speech converter 306. The speech-formatted response can be transmitted to the one or more targeted users through the voice-enabled communication session.

In some embodiments, the message manager 316 can receive a meeting request for the digital assistance system 140 to join the voice-enabled communication session. A dial-in schedule in the digital assistance system scheduling data 314 for the digital assistance system 140 can be updated to connect with one or more user systems 106 through a communication channel 105 based on the meeting request.

Figure 9:
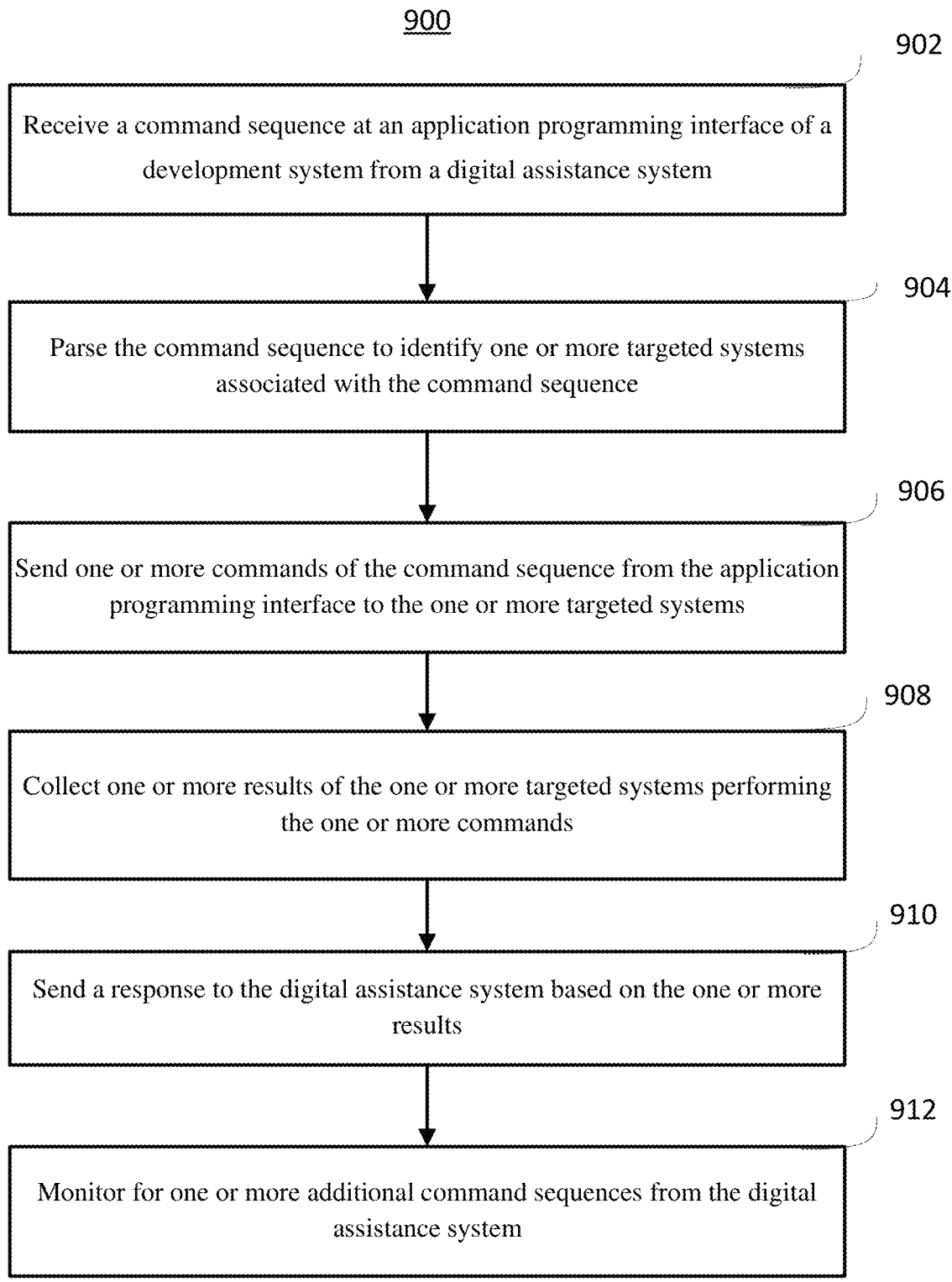
FIG. 9 depicts a process flow according to some embodiments of the present invention.

Turning now to FIG. 9, a process flow 900 is depicted according to an embodiment. The process flow 900 includes a number of steps that may be performed in the depicted sequence or in an alternate sequence. The process flow 900 may be performed by the system 100 of FIG. 1. In one embodiment, the process flow 900 is performed by the development system 102 of FIG. 1 in combination with the digital assistance system 140. The process flow 900 can comprise an extension of process flow 800 of FIG. 8. The process flow 900 is described in reference to FIGS. 1-9.

At step 902, a command sequence 312 can be received at the API 108 from the digital assistance system 140. The command sequence 312 can be received at the communication interface 402 and be buffered in the command queue 404.

At step 904, the command interpreter 406 of the API 108 can parse the command sequence 312 to identify one or more targeted systems associated with the command sequence 312. For example, the targeted systems can be a component of the development system 102 or a subsystem, such as the project management subsystem 120 or the scheduling subsystem 130. Other examples of targeted systems can include human resource systems, carpooling systems, and/or other systems that are configured to accept and respond to commands through the API 108.

At step 906, the command interpreter 406 can send one or more commands of the command sequence 312 from the API 108 to the one or more targeted systems. For instance, commands can be routed through the project management subsystem interface 408, the scheduling subsystem interface 410, or the component interface 412 if allowed by the permission manager 414.

At step 908, the response generator 415 of the API 108 can collect one or more results of the one or more targeted systems performing the one or more commands, convert the results into one or more responses, and buffer the responses in the response queue 416 as needed. At step 910, the communication interface 402 of the API 108 can send a response to the digital assistance system 140 based on the one or more results. At step 912, the API 108 can continue to monitor for one or more additional command sequences from the digital assistance system 140.

In summary with reference to FIGS. 1-4, the development system 102 can include a network interface 260 configured to communicate with a plurality of communication channels 105. The development system 102 can also include a processing system 205 configured to interface with a project management subsystem 120, a scheduling subsystem 130, and the network interface 260. The development system 102 can also include the API 108 configured to receive a command sequence 312 for the project management subsystem 120 and the scheduling subsystem 130. The digital assistance system 140 can include a natural language processing engine 302 configured to interface with a voice-enabled communication session through one of the communication channels 105. The digital assistance system 140 can also include a command generator 308 configured to generate the command sequence 312 based on one or more requested tasks detected through the voice-enabled communication session. The command generator 308 can also be configured to provide the command sequence 312 to the API 108 to execute the one or more requested tasks.

The digital assistance system 140 can be configured to connect to the voice-enabled communication session based on a meeting request from the scheduling subsystem 130. The digital assistance system 140 can also be configured to connect to the voice-enabled communication session based on an authentication with at least one of the communication channels 105.

The natural language processing engine 302 can be configured to capture one or more voice-based status updates from one or more user systems 106 connected to the voice-enabled communication session. The command generator 308 can be configured to convert the one or more voice-based status updates into one or more commands of the command sequence 312.

The one or more requested tasks can include making one or more updates to a project file in project data 124 managed by the project management subsystem 120. Further, the one or more requested tasks can include making one or more updates to a schedule in scheduling data 134 managed by the scheduling subsystem 130.

The digital assistance system 140 can include a message manager 316 configured to send and receive a plurality of digitally encoded messages. The natural language processing engine 302 can be configured to interface with the message manager 316 to parse the digitally encoded messages for the command generator 308. The message manager 316 can be configured to send the digitally encoded messages to one or more user systems 106 and receive the digitally encoded messages from the one or more user systems 106. At least a portion of the digitally encoded messages can be routed through the project management subsystem 120 or the scheduling subsystem 130.

In some embodiments, the one or more requested tasks can include scheduling of one or more actions to be performed through the project management subsystem 120. The one or more actions can include sending one or more of: a message, a reminder, a meeting request, or a report to one or more user accounts.

The digital assistance system 140 can be configured to capture a completion status of the one or more requested tasks. Further, the digital assistance system 140 can be configured to collect input for the command sequence 312 while the voice-enabled communication session is active and provide the command sequence 312 to the API 108 based on detecting termination of the voice-enabled communication session.

The digital assistant system 140 can be configured to listen for one or more command phrases. The digital assistance system 140 can be configured to associate each detected voice input in the voice-enabled communication session with a user. The API 108 can be configured to interact with one or more components accessible by the development system 102.

Technical effects include providing a voice-based digital assistant to automate task creation, performance, and scheduling for a development environment. Further technical effects include providing a secure interface for data retrieval through an API. Performing digital assistance command generation in a cloud environment can offload processing requirements within the development environment to support interactive data collection and reporting on-demand.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications.

Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a development system comprising:
   a network interface configured to communicate with a plurality of communication channels;
   a processing system configured to interface with a project management subsystem, a scheduling subsystem, and the network interface; and
   an application programming interface configured to receive a command sequence for the project management subsystem and the scheduling subsystem; and
   a digital assistance system comprising:
   a natural language processing engine configured to interface with a voice-enabled communication session through one of the plurality of communication channels, wherein the voice-enabled communication session is established as an exchange between two or more users through two or more user systems; and
   a command generator configured to:
   generate the command sequence based on one or more requested tasks detected through the voice-enabled communication session; and
   provide the command sequence to the application programming interface to execute the one or more requested tasks, wherein the digital assistance system is configured to collect input for the command sequence while the voice-enabled communication session is active and provide the command sequence to the application programming interface based on detecting termination of the voice-enabled communication session.

2. The system of claim 1, wherein the digital assistance system is configured to connect to the voice-enabled communication session based on a meeting request from the scheduling subsystem.

3. The system of claim 1, wherein the digital assistance system is configured to connect to the voice-enabled communication session based on an authentication with at least one of the plurality of communication channels.

4. The system of claim 1, wherein the natural language processing engine is configured to capture one or more voice-based status updates from one or more of the two or more user systems connected to the voice-enabled communication session.

5. The system of claim 4, wherein the command generator is configured to convert the one or more voice-based status updates into one or more commands of the command sequence.

6. The system of claim 1, wherein the one or more requested tasks comprise making one or more updates to a project file managed by the project management subsystem.

7. The system of claim 1, wherein the one or more requested tasks comprise making one or more updates to a schedule managed by the scheduling subsystem.

8. The system of claim 1, wherein the digital assistance system further comprises a message manager configured to send and receive a plurality of digitally encoded messages.

9. The system of claim 8, wherein the natural language processing engine is configured to interface with the message manager to parse the plurality of digitally encoded messages for the command generator.

10. The system of claim 8, wherein the message manager is configured to send the plurality of digitally encoded messages to one or more of the two or more user systems and receive the plurality of digitally encoded messages from one or more of the two or more user systems.

11. The system of claim 8, wherein at least a portion of the plurality of digitally encoded messages are routed through the project management subsystem or the scheduling subsystem.

12. The system of claim 1, wherein the one or more requested tasks comprise scheduling of one or more actions to be performed through the project management subsystem.

13. The system of claim 12, wherein the one or more actions comprise sending one or more of: a message, a reminder, a meeting request, or a report to one or more user accounts.

14. The system of claim 1, wherein the digital assistance system is configured to capture a completion status of the one or more requested tasks.

15. The system of claim 1, wherein the digital assistance system is configured to listen for one or more command phrases.

16. The system of claim 1, wherein the digital assistance system is configured to associate each detected voice input in the voice-enabled communication session with one of the two or more users.

17. The system of claim 1, wherein the application programming interface is configured to interact with one or more components accessible by the development system.

18. A computer program product comprising a non-transitory computer-readable storage medium embodied with computer program instructions that when executed by a computer cause the computer to implement:
   connecting to a voice-enabled communication session by a digital assistance system, wherein the voice-enabled communication session is established as an exchange between two or more users through two or more user systems;
   monitoring the voice-enabled communication session, by the digital assistance system, for a command phrase;
   applying, by the digital assistance system, natural language processing to a voice-based command detected after the command phrase;
   generating, by the digital assistance system, a command sequence associated with one or more requested tasks identified in the voice-based command; and
   providing the command sequence to an application programming interface of a development system to execute the one or more requested tasks, wherein the digital assistance system is configured to collect input for the command sequence while the voice-enabled communication session is active and provide the command sequence to the application programming interface based on detecting termination of the voice-enabled communication session.

19. The computer program product of claim 18, further comprising computer program instructions that when executed by the computer cause the computer to implement:
   identifying the voice-enabled communication session based on receiving a meeting request from a scheduling subsystem of the development system; and
   performing an authentication with a communication channel to connect the digital assistance system to the voice-enabled communication session.

20. The computer program product of claim 19, further comprising computer program instructions that when executed by the computer cause the computer to implement:
- capturing the voice-based command from one or more of the two or more user systems connected to the voice-enabled communication session;
- converting the voice-based command into a command format for the application programming interface of the development system; and
- inserting one or more formatted commands into the command sequence.

21. The computer program product of claim 20, further comprising computer program instructions that when executed by the computer cause the computer to implement:
- identifying a user of the two or more users providing a detected voice input of the voice-based command; and
- tagging the voice-based command with a user identifier based on identifying the user.

22. A computer program product comprising a non-transitory computer-readable storage medium embodied with computer program instructions that when executed by a computer cause the computer to implement:
- connecting to a voice-enabled communication session by a digital assistance system;
- monitoring the voice-enabled communication session, by the digital assistance system, for a command phrase;
- applying, by the digital assistance system, natural language processing to a voice-based command detected after the command phrase;
- generating, by the digital assistance system, a command sequence associated with one or more requested tasks identified in the voice-based command; and
- providing the command sequence to an application programming interface of a development system to execute the one or more requested tasks;
- monitoring, by the digital assistance system, for a response to the command sequence from the application programming interface;
- identifying one or more targeted users associated with the response; and
- communicating at least a portion of the response to the one or more targeted users.

23. The computer program product of claim 22, further comprising computer program instructions that when executed by the computer cause the computer to implement:
- converting the at least a portion of the response to the one or more targeted users to a speech-formatted response; and
- transmitting the speech-formatted response to the one or more targeted users through the voice-enabled communication session.

24. The computer program product of claim 18, further comprising computer program instructions that when executed by the computer cause the computer to implement:
- receiving a meeting request for the digital assistance system to join the voice-enabled communication session; and
- updating a dial-in schedule for the digital assistance system to connect with one or more of the two or more user systems through a communication channel based on the meeting request.

25. The system of claim 1, wherein the digital assistance system is configured to:
- determine a confidence level of a plurality of interpretations of a command;
- modify the command to an alternate one of the plurality of interpretations of the command having a highest confidence level above a confidence threshold prior to including the command in the command sequence;
- generate one or more follow-up questions based on determining that the confidence level of the plurality of interpretations is below the confidence threshold; and
- modify the command based on the one or more follow-up questions.

26. The computer program product of claim 18, further comprising computer program instructions that when executed by the computer cause the computer to implement:
- determining a confidence level of a plurality of interpretations of a command;
- modifying the command to an alternate one of the plurality of interpretations of the command having a highest confidence level above a confidence threshold prior to including the command in the command sequence;
- generating one or more follow-up questions based on determining that the confidence level of the plurality of interpretations is below the confidence threshold; and
- modifying the command based on the one or more follow-up questions.

* * * * *